US008517616B2

(12) United States Patent
Yi

(10) Patent No.: US 8,517,616 B2
(45) Date of Patent: Aug. 27, 2013

(54) OPTOELECTRONIC MODULE HAVING AN ADAPTER FOR USE IN EXTRACTING THE MODULE FROM A CAGE

(75) Inventor: Robert Yi, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 399 days.

(21) Appl. No.: 12/828,288

(22) Filed: Jun. 30, 2010

(65) Prior Publication Data
US 2012/0002927 A1   Jan. 5, 2012

(51) Int. Cl.
*G02B 6/36* (2006.01)
*H05K 5/00* (2006.01)

(52) U.S. Cl.
USPC ............................ 385/92; 385/76; 361/679.01

(58) Field of Classification Search
USPC ...................................... 385/76, 92
See application file for complete search history.

(56) References Cited

U.S. PATENT DOCUMENTS

| 6,430,053 B1 | 8/2002 | Peterson et al. |
| 6,434,015 B1 | 8/2002 | Hwang |
| 6,544,052 B1 | 4/2003 | Schwartz |
| 6,746,264 B1 | 6/2004 | Branch et al. |
| 7,320,551 B1 | 1/2008 | Moore et al. |
| 2004/0185696 A1 | 9/2004 | Long et al. |
| 2005/0003696 A1* | 1/2005 | Shirk et al. ................ 439/352 |
| 2005/0124224 A1 | 6/2005 | Schunk |
| 2005/0201074 A1 | 9/2005 | Huang |
| 2006/0252311 A1* | 11/2006 | Togami et al. ............. 439/607 |
| 2008/0232758 A1 | 9/2008 | Miyoshi et al. |
| 2009/0188106 A1 | 7/2009 | Wang et al. |
| 2010/0067199 A1* | 3/2010 | Chen .......................... 361/747 |
| 2010/0284657 A1 | 11/2010 | Rosch |
| 2011/0267742 A1* | 11/2011 | Togami et al. .......... 361/679.01 |

FOREIGN PATENT DOCUMENTS

| EP | 1593993 | 11/2005 |
| EP | 1548896 | 4/2006 |
| JP | 2008090148 | 4/2008 |
| WO | 2007121624 A1 | 11/2007 |

* cited by examiner

Primary Examiner — Eric Wong

(57) ABSTRACT

An optoelectronic module is provided that has an adapter that interacts with the tongue actuator of a module removal tool to actuate the cage tongue. Actuation of the cage tongue causes the latch disposed on the optoelectronic module to retract from the opening formed in the tongue to allow the optoelectronic module to be removed from the cage by the module removal tool. The adapter enables the module removal tool to be used to remove the module from the cage despite the fact that the distance between the optical reference plane and the mechanical actuation plane and the distance between the optical reference plane and the bottom surface of the cage may differ.

10 Claims, 11 Drawing Sheets

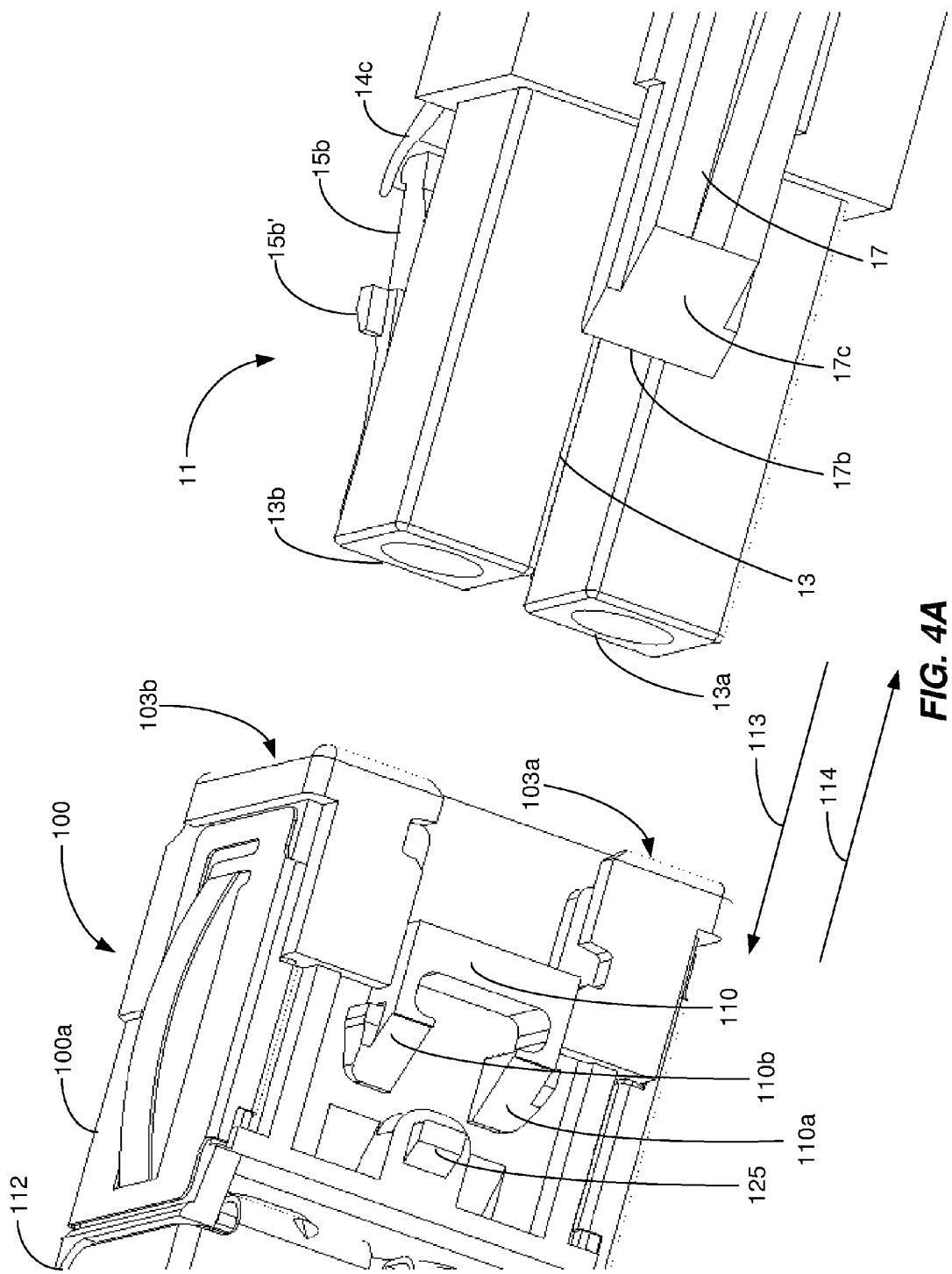

OPTOELECTRONIC MODULE HAVING AN ADAPTER FOR USE IN EXTRACTING THE MODULE FROM A CAGE

TECHNICAL FIELD OF THE INVENTION

The invention relates to optoelectronic modules. More particularly, the invention relates to an optoelectronic module having an adapter that facilitates extraction of the module from a cage.

BACKGROUND OF THE INVENTION

In optical communications networks, optoelectronic modules are used to transmit and/or receive optical signals over optical fibers. The optoelectronic module may be configured as an optical transmitter that transmits optical signals, an optical receiver that receives optical signals, or an optical transceiver that transmits and receives optical signals. On the transmit side of an optical transmitter or transceiver module, a light source (e.g., a laser diode) generates amplitude modulated optical signals that represent data, which are optically coupled by an optics system of the module into an end of a transmit optical fiber. The signals are then transmitted over the transmit fiber to a receiver node of the network. On the receive side of an optical receiver or transceiver module, an optics system of the module receives optical signals output from an end of a receive optical fiber and focuses the optical signals onto an optical detector (e.g., a photodiode), which converts the optical energy into electrical energy.

The transmit and receive fiber cables have connectors on their ends, often LC connectors, that are adapted to mate with transmit and receive receptacles, respectively, formed in an optoelectronic module. A variety of optoelectronic module configurations are used in optical communications networks. Some optoelectronic modules have a single receive receptacle and a single transmit receptacle arranged side by side for connecting a single receive fiber cable and a single transmit fiber cable, respectively, to the optoelectronic module. Oftentimes, the optoelectronic module is configured to be inserted into a cage. In such cases, locking features on the cage and on the optoelectronic module interlock the module with the cage. Generally, the locking features include a latch that protrudes from the optoelectronic module and a tongue on the cage having an opening formed therein for receiving the latch.

FIG. 1A illustrates a perspective bottom view of an optoelectronic module 2 partially inserted into a cage 6. FIG. 1B illustrates a perspective bottom view of the optoelectronic module 2 shown in FIG. 1A after the optoelectronic module 2 has been fully inserted into the cage 6. The optoelectronic module 2 has first and second receptacles 3a and 3b formed therein for receiving respective connectors (not shown) located on ends of transmit and receive optical fibers (not shown), respectively. The optoelectronic module 2 has a latch 4 thereon that operates as one of the aforementioned locking features. The cage 6 has a tongue 7 thereon that has an opening 7a formed therein that is shaped to receive the latch 4 disposed on the optoelectronic module 2. When the optoelectronic module 2 is fully inserted into the cage 6, as shown in FIG. 1B, the latch 4 mates with the opening 7a to lock the optoelectronic module 2 to the cage 6.

Optoelectronic modules of the type shown in FIGS. 1A and 1B sometimes have a bail (not shown) that acts as a delatch mechanism to retract the latch 4 from the opening 7a formed in the tongue 7. In such configurations, when a user moves the bail to a delatching position, the latch 4, which is mechanically linked to the bail (not shown), retracts from the opening 7a formed in the tongue 7 allowing the module 2 to be removed from the cage 6. Optoelectronic modules of the type shown in FIGS. 1A and 1B that do not include a bail delatching mechanism are typically extracted from the cage using a module removal tool, as will now be described with reference to FIGS. 2 and 3.

FIG. 2 illustrates a perspective view of a known module removal tool 11 that may be used to remove the optoelectronic module 2 shown in FIGS. 1A and 1B from the cage 6 shown in FIGS. 1A and 1B. The tool 11 has a handle 14 that has a proximal end 14a and a distal end 14b. The distal end 14b of the handle 14 has a delatching mechanism 14c thereon that projects upwardly and outwardly away from the distal end 14b. A mock LC connector portion 13 is disposed on the distal end 14b of the handle 14. The mock LC connector portion 13 has delatching mechanisms 15a and 15b thereon, which are described below in more detail with reference to FIG. 3. The delatching mechanism 14c disposed on the distal end 14b of the handle 14 is positioned to depress the delatching mechanisms 15a and 15b of the mock LC connector portion 13 when a force is exerted on the delatching mechanism 14c in a direction toward the mock LC connector portion 13.

FIG. 3 illustrates a side cross-sectional view of the cage 6 shown in FIGS. 1A and 1B with the mock LC connector portion 13 of the tool 11 shown in FIG. 2 partially inserted therein. For clarity, the optoelectronic module 2 shown in FIGS. 1A and 1B is not shown in FIG. 3. The mock LC connector portion 13 of the module removal tool 11 is shaped and sized to fit within and mate with the receptacles 3a and 3b of the optoelectronic module 2 in the same way that an actual LC connector pair would fit within and mate with the receptacles 3a and 3b of the optoelectronic module 2. The actual LC connector pair (not shown) that would normally be connected to the receptacles 3a and 3b for operations have been removed to enable the tool 11 to be used to extract the module 2 from the cage 6.

A tongue actuator 17 disposed on the lower portion of the handle 14 of the tool 11 has a proximal end 17a and a distal end 17b. The distal end 17b of the tongue actuator 17 has a ramped bottom surface 17c and a substantially flat top surface 17d (FIG. 2). The ramped bottom surface 17c is at an angle to the substantially flat top surface 17d. When the distal end 17b of the module removal tool 11 is inserted into the cage 12 in the direction indicated by arrow 21 such that ramped bottom surface 17c comes into contact with the tongue 7 of the cage 6, the distal end 17b of the tongue actuator 17 deflects the tongue 7 in the downward direction, thereby causing the latch 4 of the optoelectronic module 2 to disengage from the opening 7a (FIG. 1B) formed in the tongue 7. When the tool 11 is in this position, mating features 15a' and 15b' (FIG. 2) on the delatching mechanisms 15a and 15b, respectively, are mated with corresponding mating features (not shown) inside of the receptacles 3a and 3b to cause the mock LC connector portion 13 to be interlocked with the optoelectronic module 2. In this interlocked position, the optoelectronic module 2 may be removed from the cage 6 by exerting a force on the handle 14 in a direction that is generally opposite to the direction indicated by arrow 21.

Although the module removal tool 11 is an effective mechanism for extracting optoelectronic modules from cages, the tool 11 is generally limited to use with cage/module assemblies in which there is a particular distance between an optical reference plane 25 (FIG. 3) and a mechanical actuation plane 26 (FIG. 3). The optical axes of the mock LC connector portion 13 define the optical reference plane 25, which also corresponds to the optical reference plane of the optoelectronic module 2 shown in FIGS. 1A and 1B. The flat top surface 17d of the tongue actuator 17 defines the mechanical actuation plane 26, which is also the plane in which the bottom surface of the cage 6 lies. The optical reference plane 25 and the mechanical actuation plane 26 are parallel to one another and separated by a particular distance, d. The module removal tool 11 will not work well, or at all, in cases where the distance d is not equal to the distance between the bottom surface of the cage 6 and the optical reference plane 25. Consequently, the module removal tool 11 is very limited with respect to the types of cage/module assemblies with which the module removal tool 11 will work effectively.

Optoelectronic modules and cages are made in a variety of configurations by a variety of vendors. In these various configurations, the distance between the optical reference plane and the bottom surface of the cage may also vary. Of course, for reasons described above, a module removal tool such as that shown in FIGS. 2 and 3 may not work properly with these different configurations. It would be desirable to provide a way to enable a module removal tool to be used effectively with optoelectronic modules and cages of various configurations.

SUMMARY OF THE INVENTION

The invention is directed to an optoelectronic module having an adapter for use in extracting the module from a cage, and to a method for using a module extraction tool to extract an optoelectronic module from a cage. The optoelectronic module comprises an optoelectronic module housing, a latch and an adapter. The optoelectronic module housing is configured to be mated with a cage. The module housing has at least upper and lower surfaces. The latch extends a distance below the lower surface of the module housing and is configured to mate with an opening formed in a tongue of a cage when the optoelectronic module is inserted into a cage. The adapter is mechanically coupled to the module housing and is configured to transfer an actuator force exerted on the adapter by a module removal tool to a tongue of the cage to cause the cage tongue to be deflected to a sufficient extent to disengage the latch from the opening formed in the cage tongue.

The method comprises the following. In an optoelectronic module having an adapter mechanically coupled to a housing of the optoelectronic module, using a module removal tool to cause an actuator force to be exerted on the adapter. The adapter transfers the actuator force exerted on the adapter to a tongue of a cage in which the optoelectronic module is being held. The transference of the actuator force to the tongue causes the tongue to be deflected to a sufficient extent to disengage a latch of the optoelectronic module from an opening formed in the cage tongue. The module removal tool is used to extract the optoelectronic module from the cage after the latch has been disengaged from the opening formed in the cage tongue.

These and other features and advantages of the invention will become apparent from the following description, drawings and claims.

BRIEF DESCRIPTION OF THE DRAWINGS

FIGS. 4A-4C illustrate respective perspective views of an optoelectronic module having an adapter thereon that interacts with a module removal tool to enable the module removal tool to be used to remove the optoelectronic module from a cage.

DETAILED DESCRIPTION OF AN ILLUSTRATIVE EMBODIMENT

Figure 2:
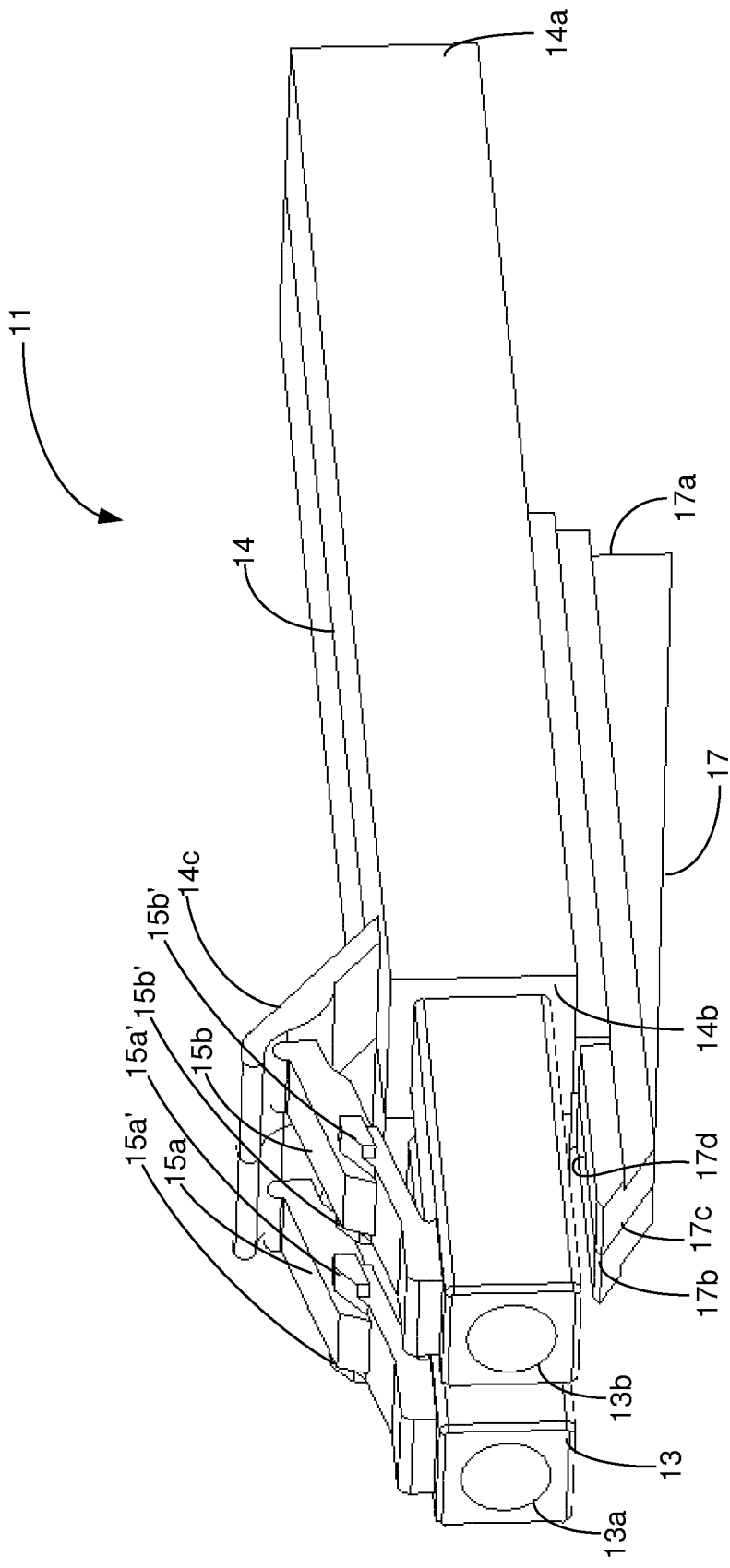
FIG. 2 illustrates a perspective view of a known module removal tool that may be used to remove the optoelectronic module shown in FIGS. 1A and 1B from the cage shown in FIGS. 1A and 1B.
Figure 3:
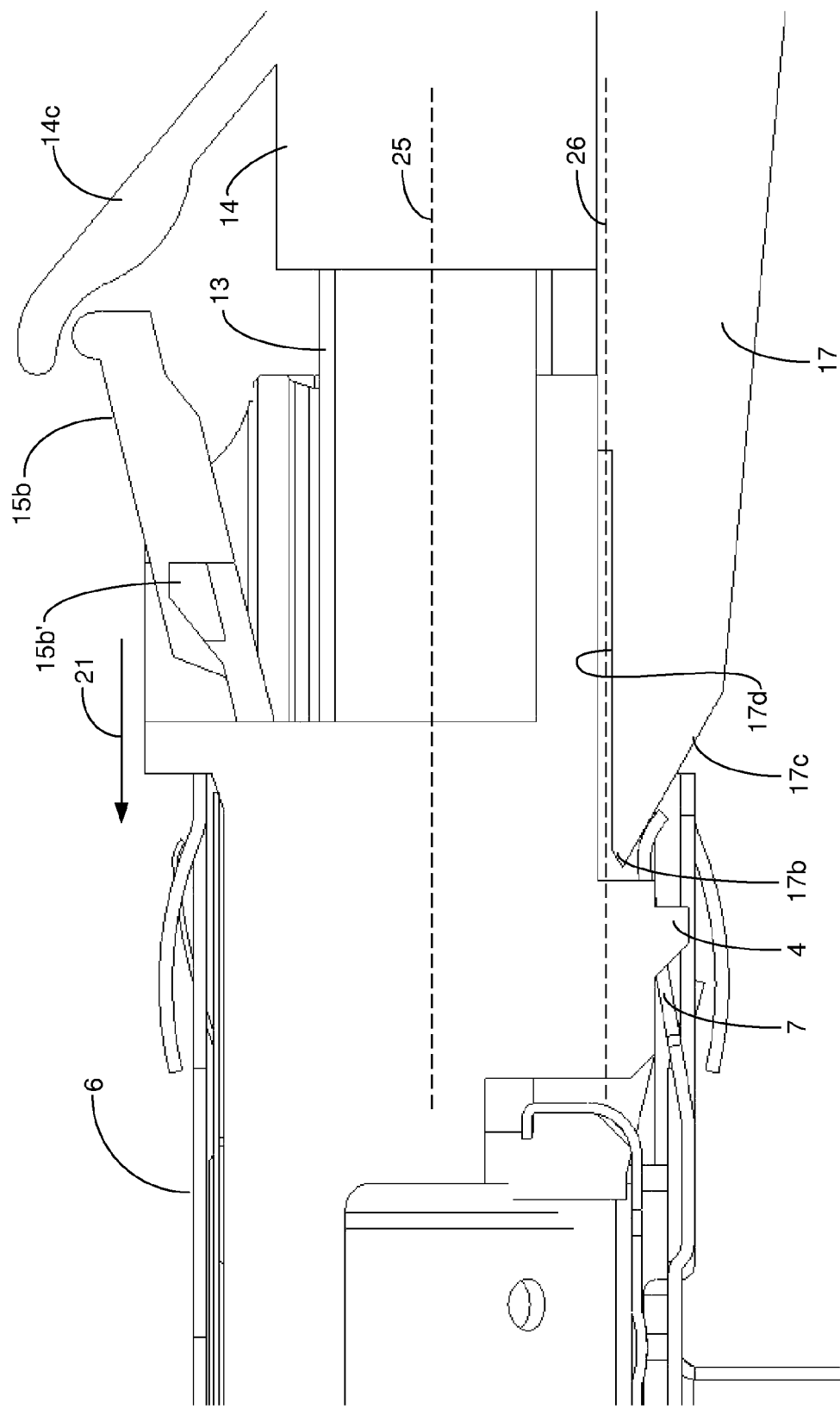
FIG. 3 illustrates a side cross-sectional view of the cage shown in FIGS. 1A and 1B with the mock LC connector portion of the module removal tool shown in FIG. 2 partially inserted therein.

In accordance with the invention, an optoelectronic module is provided that includes an adapter that interacts with the tongue actuator of a module removal tool of the type described above with reference to FIGS. 2 and 3 to actuate the cage tongue to allow the optoelectronic module to be removed from the cage. The adapter enables the module removal tool to be used to remove the module from the cage despite the fact that the distance between the optical reference plane and the mechanical actuation plane may not be equal to the distance between the optical reference plane and the bottom surface of the cage.

The adapter of the invention may have a variety of configurations. Therefore, a few illustrative embodiments of the adapter will be described below with reference to the figures. It will be understood by persons skilled in the art that the invention is not limited to the adapter configurations described herein. The embodiments described herein are merely illustrative, or exemplary, and are intended to demonstrate the principles and concepts of the invention.

Figure 4B:
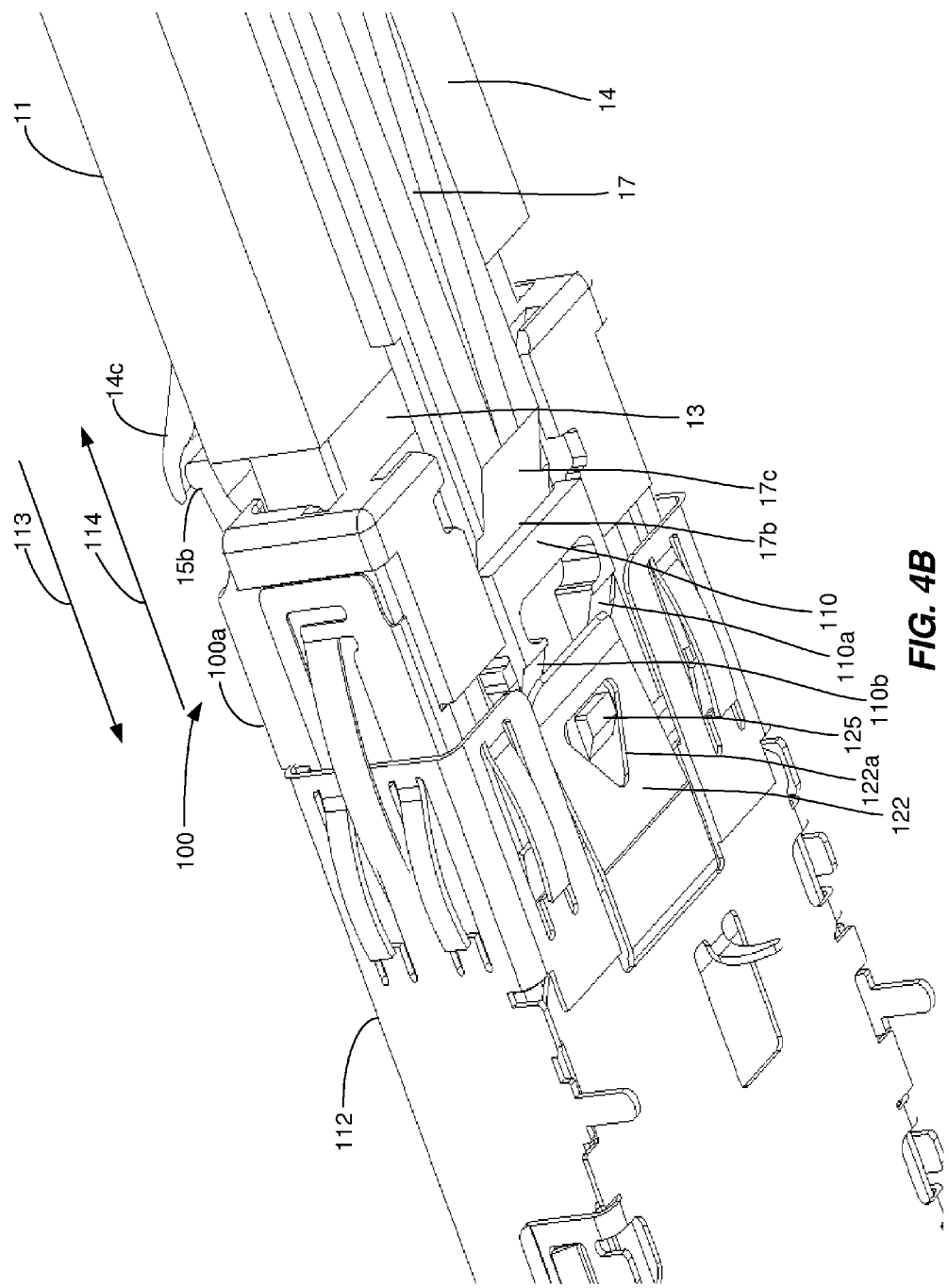
Figure 4C:
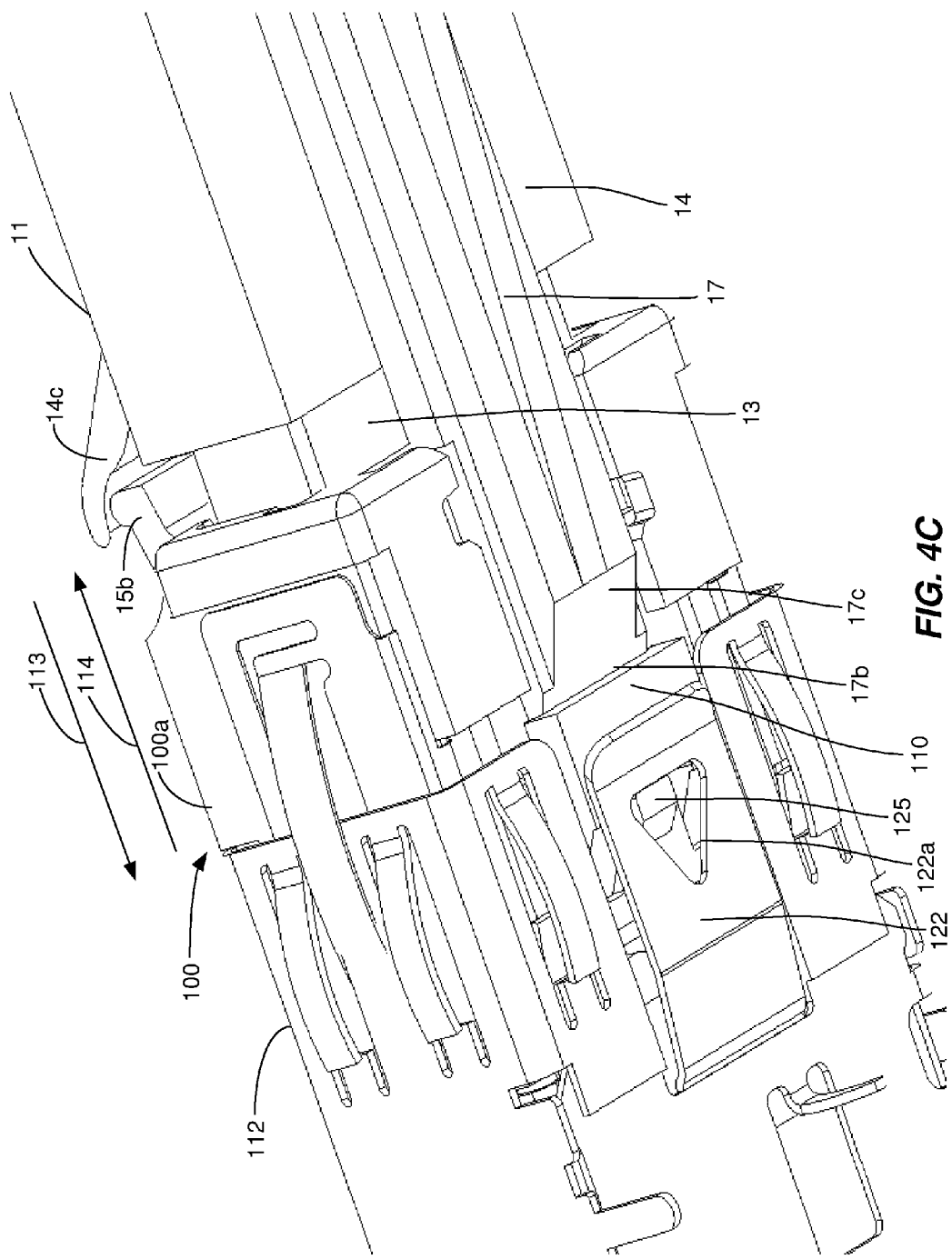

FIGS. 4A-4C illustrate respective perspective views of an optoelectronic module 100 having a module housing 100a and an adapter 110 secured to the module housing 100a. The adapter 110 operates in conjunction with a module removal tool to enable the module removal tool to be used to remove the optoelectronic module 100 from a cage 112. In the bottom perspective view of FIG. 4A, the optoelectronic module 100 and the module removal tool 11 are shown just prior to the module removal tool 11 being inserted into the optoelectronic module 100. For purposes of demonstrating the manner in which the adapter 110 operates, it will be assumed that the module removal tool 11 shown in FIGS. 4A-4C has a configuration that is identical to that of the module removal tool 11 described above with reference to FIGS. 2 and 3. It should be noted, however, that the invention is not limited to being used with any particular type of module removal tool.

Figure 1A:
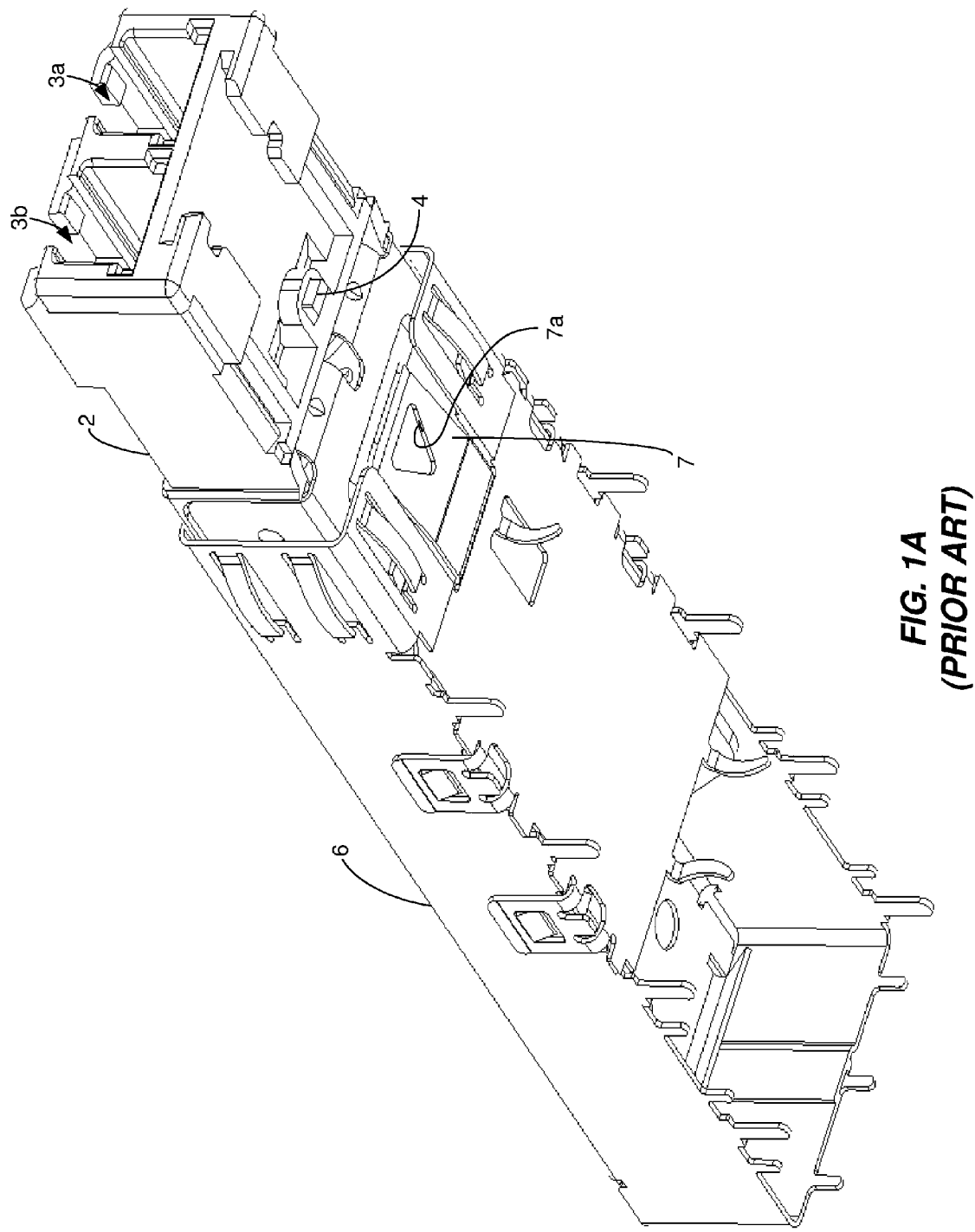
FIG. 1A illustrates a perspective bottom view of a known optoelectronic module partially inserted into a known cage.
Figure 1B:
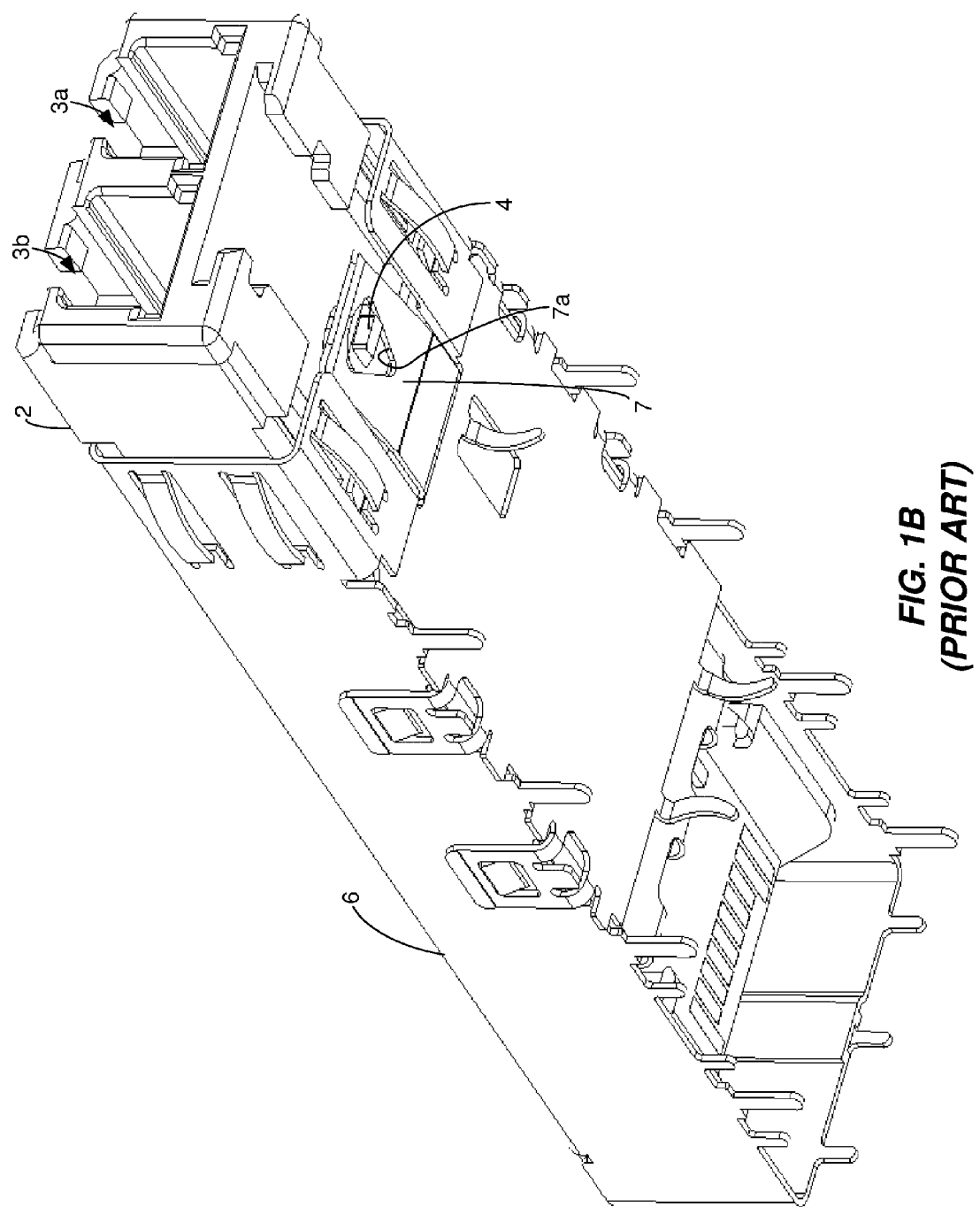
FIG. 1B illustrates a perspective bottom view of the optoelectronic module shown in FIG. 1A after the optoelectronic module has been fully inserted into the cage.

The module housing 100a has receptacle openings 103a and 103b formed therein for receiving an LC connector pair (not shown). In FIGS. 4A and 4B, the optoelectronic module 100 is shown in mating engagement with the cage 112. As shown in FIG. 4B, a tongue 122 of the cage 112 has an opening 122a formed therein mates with a latch 125 of the optoelectronic module 100 to interlock the module 100 with the cage 112 in the same manner described above with reference to FIG. 1B in which the latch 4 mates with the tongue opening 7a. The tongue 122 of the cage 112 is not shown in FIG. 4A to allow the configuration of the adapter 110 to be more easily seen. The adapter 110 of the optoelectronic module 100 and exterior portions of the module housing 100a of the optoelectronic module 100 are configured to allow the adapter 110 to slide along the bottom surface of the module housing 100a in the directions indicated by arrows 113 and 114, as will be described in more detail below with reference to FIGS. 5A and 5B.

In FIG. 4B, the adapter 110 is shown in its neutral position just prior to the adapter 110 coming into contact with the cage tongue 122. In FIG. 4C, the adapter 110 is shown in its actuated position in which the adapter 110 is in contact with the cage tongue 122 such that the cage tongue 122 is deflected. When the module removal tool 11 is inserted into the optoelectronic module 100 as shown in FIG. 4C, the distal end 17b of the tongue actuator 17 of the tool 11 pushes the adapter 110 in the direction indicated by arrow 113 to move the adapter 110 from the neutral position to the actuated position. In the actuated position of the adapter 110 shown in FIG. 4C, ramped surfaces 110a and 110b of the adapter 110 exert downwardly directed forces on the tongue 122 of the cage 112 that deflect the tongue 122 in the downward direction, i.e., away from the optoelectronic module 100. This deflection of the cage tongue 122 causes the latch 125 of the optoelectronic module 100 to disengage from the opening 122a formed in the tongue 122 until the latch 125 is no longer mated with the opening 122a. Once the latch 125 has been disengaged from the opening 122a in this manner, a force exerted by a user on the handle 14 of the tool 11 in a direction parallel to the direction of arrow 114 will cause the module 100 to be extracted from the cage 112.

Figure 5A:
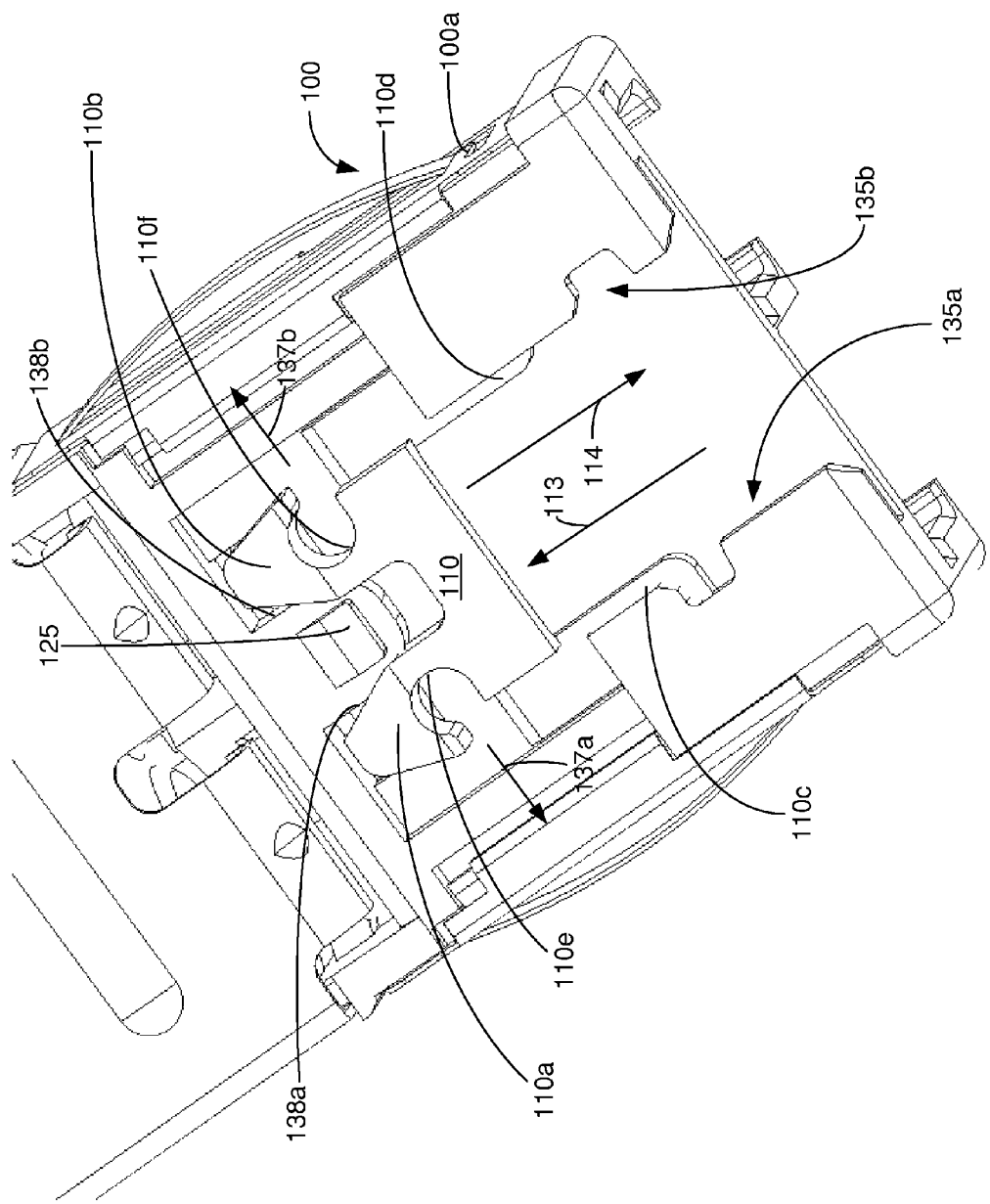
FIGS. 5A and 5B illustrate bottom perspective views of a portion of the optoelectronic module shown in FIGS. 4A-4C that more clearly show the configuration of the adapter of the optoelectronic module; the adapter is shown in its actuated position in FIG. 5A and in its neutral position in FIG. 5B.
Figure 5B:
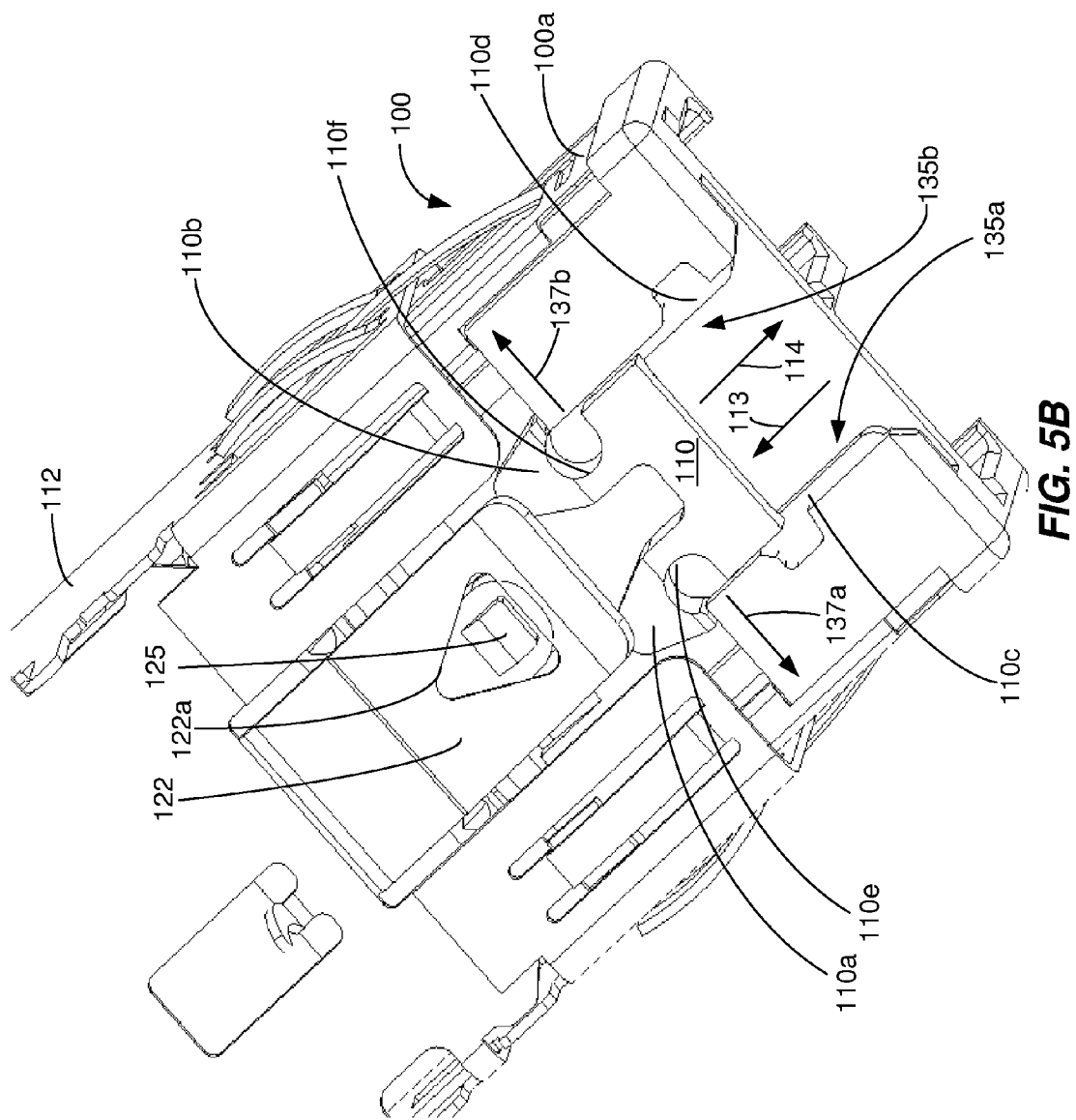

FIGS. 5A and 5B illustrate bottom perspective views of a portion of the optoelectronic module 100 that more clearly shows the configuration of the adapter 110. In FIG. 5A, the adapter 110 is shown in its actuated position. In FIG. 5B, the adapter 110 is shown in its neutral position. In order to allow the adapter 110 to be moved from the neutral position to the actuated position, the adapter 110 has guided members 110c and 110d that are in sliding engagement with guide members 135a and 135b, respectively, formed on the module housing 100a of the optoelectronic module 100. The guide members 135a and 135b are essentially elongated slots formed on opposite sides of the lower surface of the module housing 100a. The guided members 110c and 110d of the adapter 110 glide within the slots 135a and 135b to allow the adapter 110 to be moved from the neutral position to the actuated position, and vice versa.

In addition, in accordance with this illustrative the embodiment, the adapter 110 has notches 110e and 110f formed therein that allow the notched portions of the adapter 110 to flex in the directions indicated by arrows 137a and 137b. When the adapter 110 is in the actuated position shown in FIG. 5A, features 138a and 138b on the module housing 100a exert forces on the adapter 110 that cause the adapter 110 to flex generally in the directions of arrows 137a and 137b. At the same time, The flexed adapter 110 exerts forces on the features 138a and 138b of the module housing 100a that cause the adapter 110 to be pushed back to the neutral position shown in FIG. 5B in which the adapter 110 is no longer flexed. This feature prevents unintended interaction between the ramped surfaces 110a and 110b of the adapter 110 and the cage tongue 122 by causing the adapter 110 to slide back to its neutral position when the adapter 110 is not being actuated by the tongue actuator 17 of the module removal tool 11.

Figure 6:
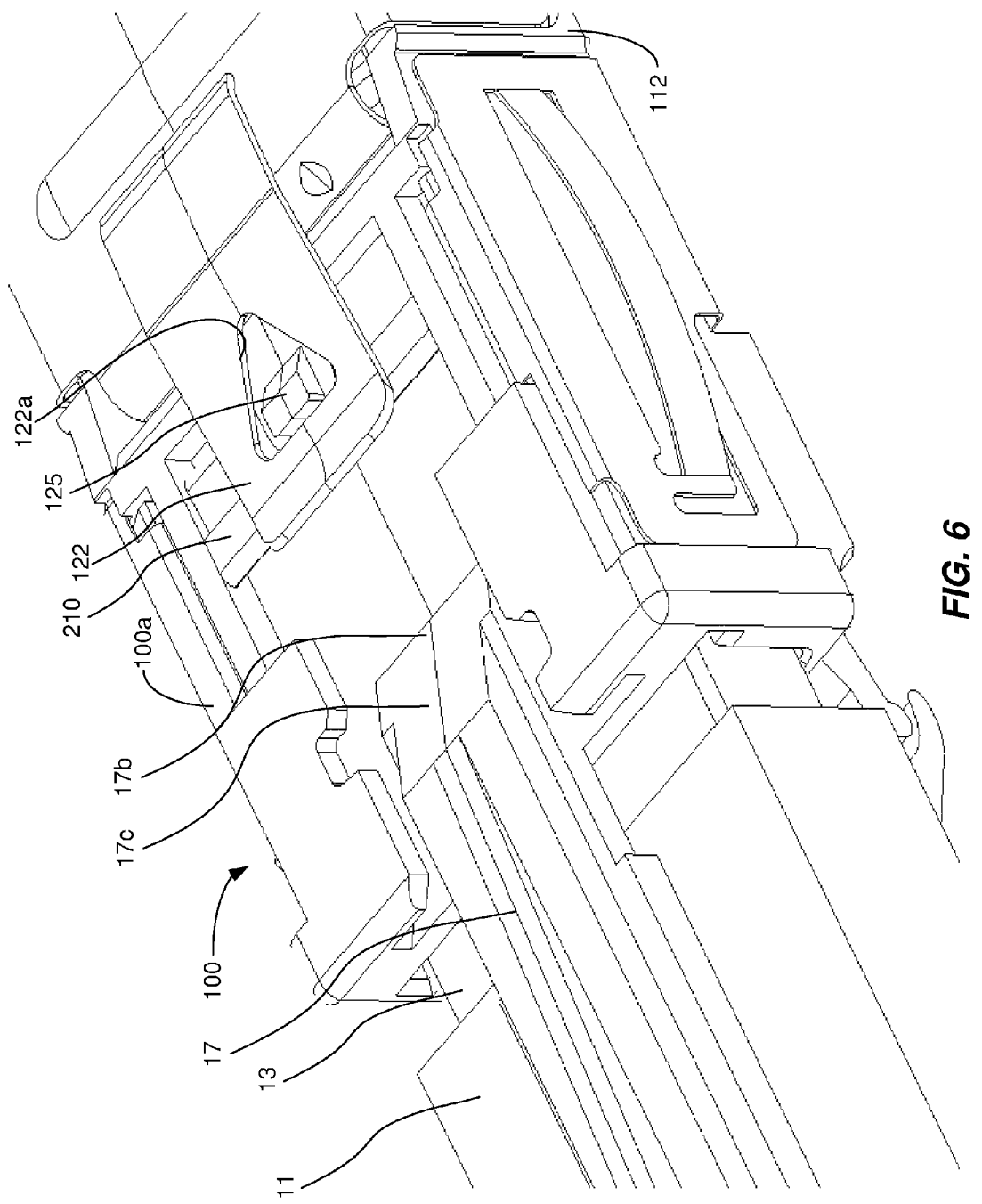
FIG. 6 illustrates a bottom perspective view of the optoelectronic module in accordance with another illustrative embodiment in which the adapter of the optoelectronic module is a flexible device that flexes rather than slides.
Figure 7:
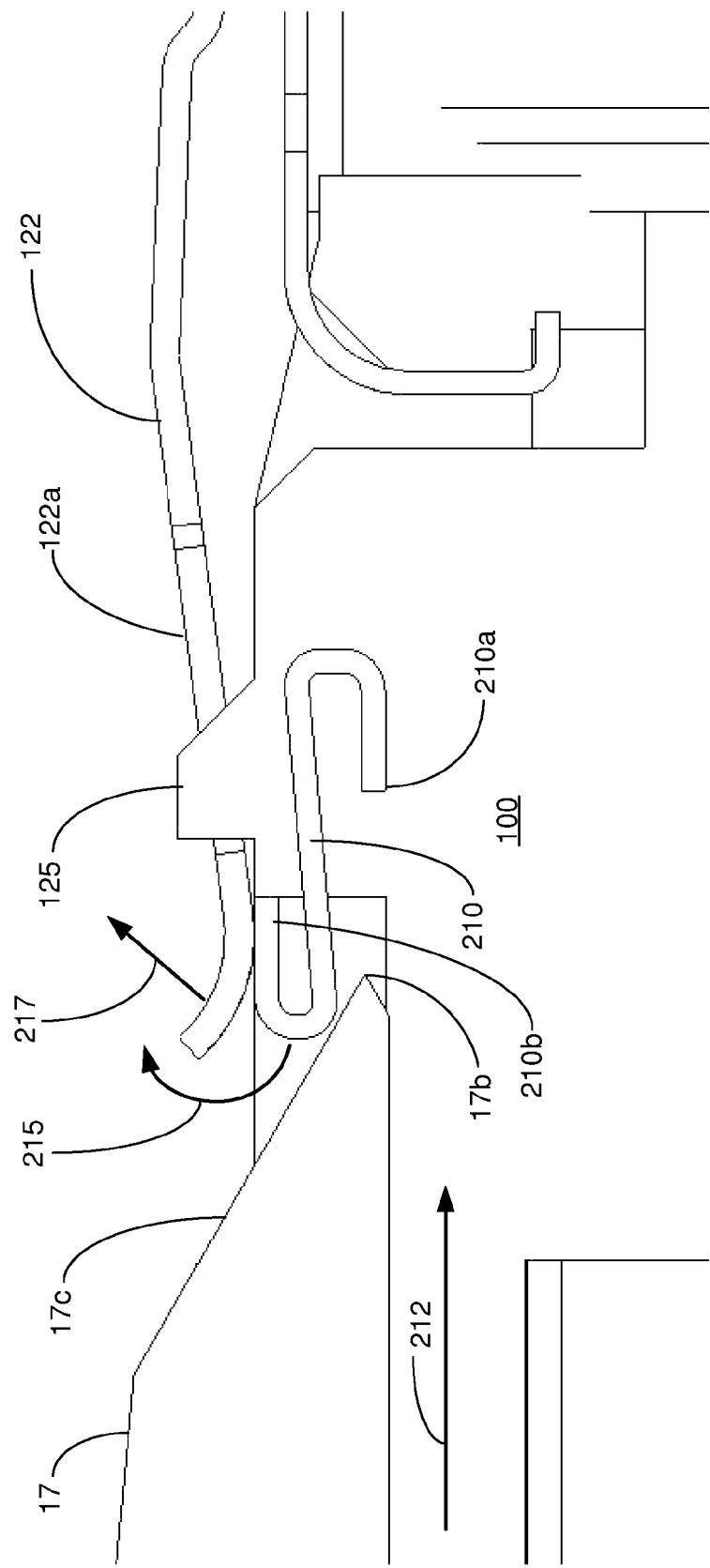
FIG. 7 illustrates a side view of the optoelectronic module shown in FIG. 6.

FIG. 6 illustrates a bottom perspective view of the optoelectronic module 100 in accordance with another illustrative embodiment in which the adapter 210 of the optoelectronic module 100 is a flexible device that flexes rather than slides. FIG. 7 illustrates a side view of the optoelectronic module 100 shown in FIG. 6. The optoelectronic module 100 shown in FIGS. 6 and 7 has the same configuration as the optoelectronic module 100 shown in FIGS. 4A-4C except that the adapter 210 shown in FIGS. 6 and 7 is different from the adapter 110 shown in FIGS. 4A-5B. In the same manner described above with reference to FIG. 4B, the optoelectronic module 100 shown in FIGS. 6 and 7 is interlocked with the cage 112 (FIG. 6) via the mating of the latch 125 with the opening 122a formed in the cage tongue 122. The configuration of the adapter 210 and the manner in which it operates will now be described with reference to FIG. 7.

The adapter 210 is an S-shaped piece of sheet metal having a proximal end 210a and a distal end 210b. The proximal end 210a is secured to the module housing 100a of the optoelectronic module 100 and the distal end 210b is disposed in close proximity to the cage tongue 122. The S-shape of the adapter 210 gives the adapter 210 spring characteristics that allow it to be temporarily deformed from its original shape and then to restore itself to its original shape. As the tongue actuator 17 of the module removal tool 11 moves in the direction indicated by arrow 212 (FIG. 7), the lower ramped surface 17c of the tongue actuator 17 of the tool 11 comes into contact with the distal end 210b of the adapter 210 causing the adapter 210 to flex upwardly in the direction indicated by arrow 215. As the tongue actuator 17 continues to move in the direction indicated by arrow 212, the adapter 210 continues to flex upwardly against the cage tongue 122 causing the cage tongue 122 to be deflected in the direction indicated by arrow 217 until the latch 125 is no longer mated with the opening 122a formed in the cage tongue 122. Once the latch 125 is no longer mated with the opening 122a, the optoelectronic module 100 can be extracted from the cage 112.

It can be seen from the illustrative embodiments described above with reference to FIGS. 4A-7 that different configurations of the adapter will achieve the goals of the invention of deflecting the cage tongue 122 to the extent necessary to disengage the latch 125 from the opening 122a formed in the cage tongue 122 to allow the optoelectronic module to be extracted from the cage 112. Persons skilled in the art will understand that the configurations shown and described herein are a few examples of many possible configurations of the adapter. The adapter may employ many other mechanisms such as, for example, pivot-based linkages to perform the same task of deflecting the cage tongue to disengage the latch from the opening. Thus, the invention is not limited to the adapter configurations described herein. Any adapter configuration that allows the adapter to redirect a force exerted on it by a module removal tool onto the cage tongue to cause the latch to disengage from the opening formed in the cage tongue is within the scope of the invention. In other words, when an actuation force is exerted on the adapter by a module removal tool, the adapter transfers at least a portion that force to the cage tongue to cause the cage tongue to be deflected to a sufficient extent to disengage the latch from the opening formed in the cage tongue.

It should be noted that the invention is not limited to the embodiments described above with reference to the illustrative embodiments. Persons skilled in the art will understand that many modifications may be made to the embodiments described herein and that all such modifications are within the scope of the invention. For example, the invention is not limited to any particular configurations for the optoelectronic module, for the cage, or for the module removal tool. In addition, the optoelectronic module may be an optical transceiver module, an optical receiver module, or an optical transmitter module. As indicated above, the invention also is not limited to any particular configuration for the adapter itself.

What is claimed is:

1. An optoelectronic module comprising:
an optoelectronic module housing configured to be mated with a cage, the module housing having at least upper and lower surfaces;
a latch extending a distance below the lower surface of the module housing, the latch being configured to mate with an opening formed in a tongue of a cage when the optoelectronic module is inserted into a cage; and
an adapter mechanically coupled to the module housing, the adapter being configured to receive an actuator force from a separate module removal tool, the adapter being further configured to transfer the actuator force exerted on the adapter by the separate module removal tool to a tongue of the cage to cause the cage tongue to be deflected to a sufficient extent to disengage the latch from the opening formed in the cage tongue.

2. The optoelectronic module of claim 1, wherein the adapter is mechanically coupled to the module housing by a sliding arrangement that allows the adapter to be moved in a substantially horizontal direction with respect to the housing from a neutral position to an actuated position, and vice versa, and wherein in the neutral position, forces exerted on the adapter are generally isolated from the cage tongue, and wherein in the actuated position, an actuator force exerted on the adapter is transferred to the cage tongue to cause the cage tongue to be deflected to a sufficient extent to disengage the latch from the opening formed in the cage tongue.

3. The optoelectronic module of claim 2, wherein the sliding arrangement comprises one or more guide members formed on the lower surface of the module housing and one or more guided members formed on the adapter, wherein said one or more guided members are guided by said one or more guide members to allow the adapter to be moved in a substantially horizontal direction with respect to the housing from a neutral position to an actuated position, and vice versa.

4. The optoelectronic module of claim 1, wherein the adapter is mechanically coupled to the module housing by a fixed arrangement comprising a proximal end of the adapter and a portion of the module housing to which the adapter is fixedly secured, and wherein a distal end of the adapter is disposed in close proximity to or in contact with the cage tongue, and wherein the adapter has spring characteristics, wherein the spring characteristics of the adapter allow the adapter to be temporarily deformed from its original shape to a deformed shape when an actuator force is exerted on the adapter and to restore to its original shape when the actuator force is removed.

5. The optoelectronic module of claim 4, wherein if an actuator force is exerted by the separate module removal tool on the adapter, the adapter temporarily deforms to transfer at least a portion of the actuator force through the distal end of the adapter to the cage tongue to cause the cage tongue to be deflected to a sufficient extent to disengage the latch from the opening formed in the cage tongue.

6. A communications device comprising:
a cage configured to hold an optoelectronic module therein, the cage having at least an upper surface and a lower surface, the lower surface of the cage having a cage tongue disposed thereon, the cage tongue having an opening formed therein for engaging a latch;
an optoelectronic module held in the cage, the optoelectronic module comprising:
an optoelectronic module housing;
a latch extending a distance below the lower surface of the module housing, the latch being mated with the opening formed in the cage tongue; and
an adapter mechanically coupled to the module housing, the adapter being configured to receive an actuator force from a separate module removal tool, the adapter being further configured to transfer the actuator force exerted on the adapter by the separate module removal tool to the cage tongue to cause the cage tongue to be deflected to a sufficient extent to disengage the latch from the opening formed in the cage tongue.

7. The communications device of claim 6, wherein the adapter is mechanically coupled to the module housing by a sliding arrangement that allows the adapter to be moved in a substantially horizontal direction with respect to the housing from a neutral position to an actuated position, and vice versa, and wherein in the neutral position, forces exerted on the adapter are generally isolated from the cage tongue, and wherein in the actuated position, an actuator force exerted on the adapter is transferred to the cage tongue to cause the cage tongue to be deflected to a sufficient extent to disengage the latch from the opening formed in the cage tongue.

8. The communications device of claim 7, wherein the sliding arrangement comprises one or more guide members formed on the lower surface of the module housing and one or more guided members formed on the adapter, wherein said one or more guided members are guided by said one or more guide members to allow the adapter to be moved in a substantially horizontal direction with respect to the housing from a neutral position to an actuated position, and vice versa.

9. The communications device of claim 6, wherein the adapter is mechanically coupled to the module housing by a fixed arrangement comprising a proximal end of the adapter and a portion of the module housing to which the adapter is fixedly secured, and wherein a distal end of the adapter is disposed in close proximity to or in contact with the cage tongue, and wherein the adapter has spring characteristics, wherein the spring characteristics of the adapter allow the adapter to be temporarily deformed from its original shape to a deformed shape when an actuator force is exerted on the adapter and to restore to its original shape when the actuator force is removed.

10. The communications device of claim 9, wherein if an actuator force is exerted by the separate module removal tool on the adapter, the adapter temporarily deforms to transfer at least a portion of the actuator force through the distal end of the adapter to the cage tongue to cause the cage tongue to be deflected to a sufficient extent to disengage the latch from the opening formed in the cage tongue.

* * * * *